July 21, 1970 R. J. MARTIN 3,521,450
REMOTE HYDRAULIC CONTROL
Filed May 23, 1968 4 Sheets-Sheet 1

INVENTOR.
ROBERT J. MARTIN
BY
*Hubert Miller*
ATTORNEY

July 21, 1970 R. J. MARTIN 3,521,450
REMOTE HYDRAULIC CONTROL
Filed May 23, 1968 4 Sheets-Sheet 2
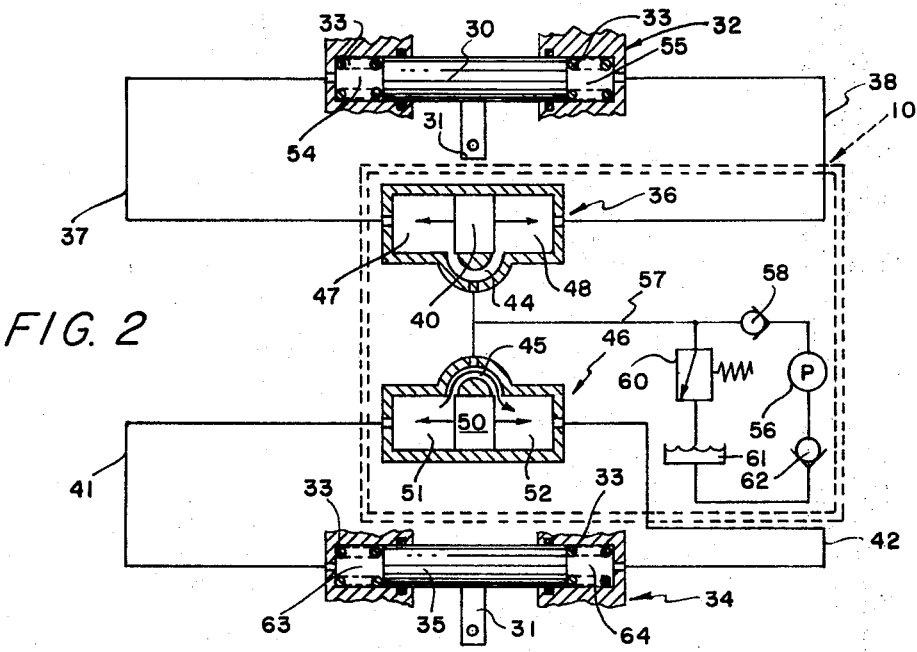
FIG. 2
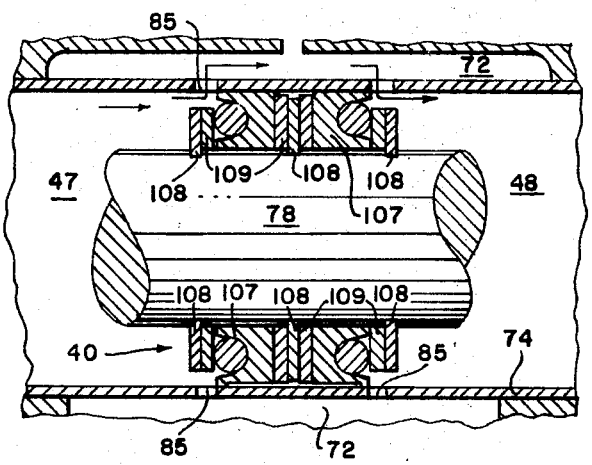
FIG. 4
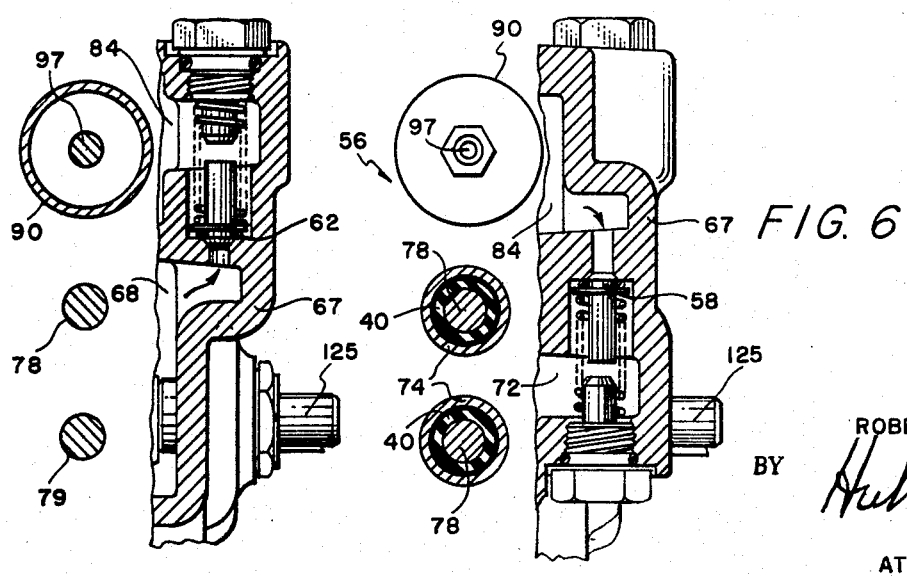
FIG. 5
FIG. 6
INVENTOR.
ROBERT J. MARTIN
BY Hubert Miller
ATTORNEY

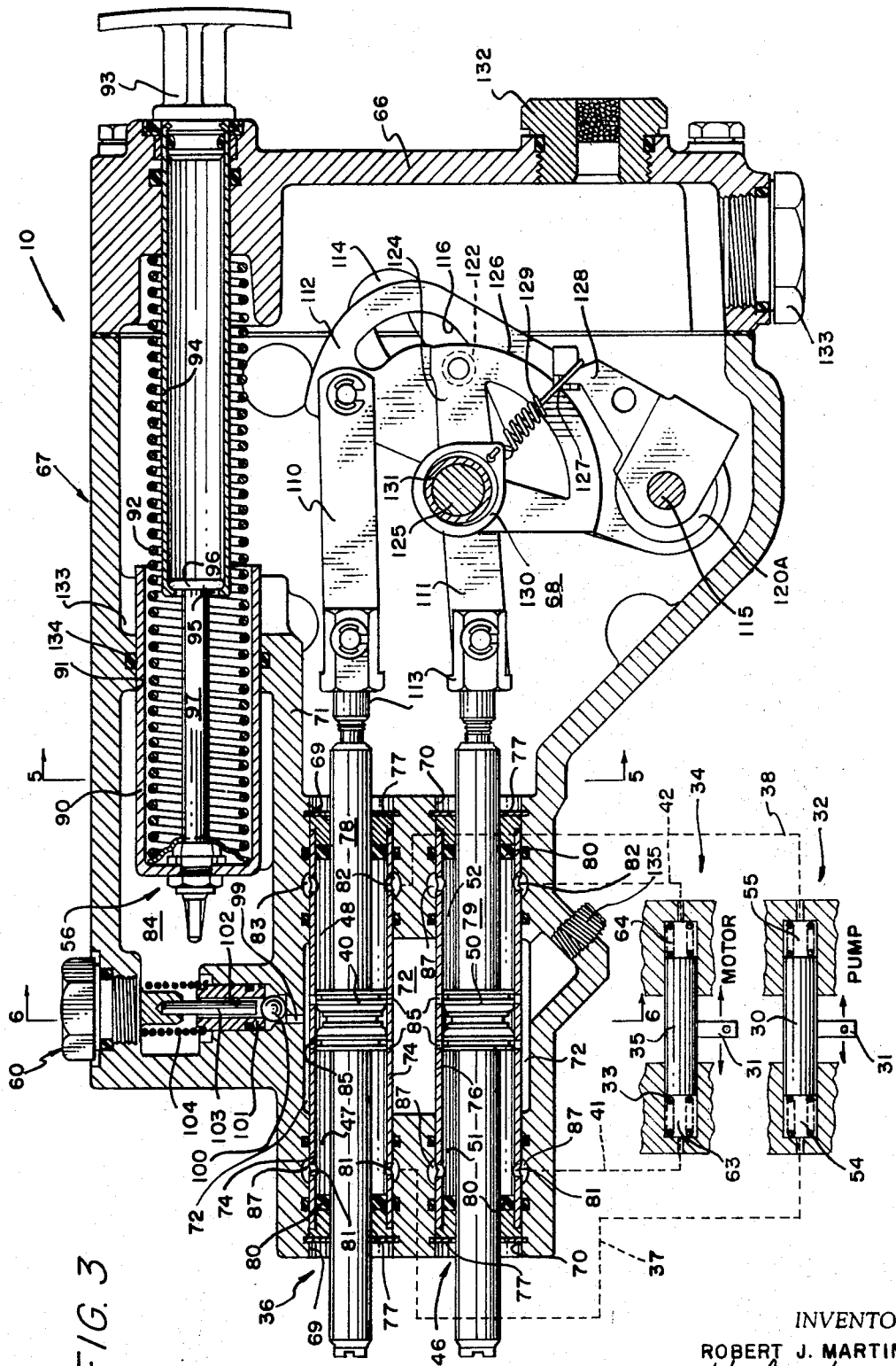

July 21, 1970  R. J. MARTIN  3,521,450
REMOTE HYDRAULIC CONTROL
Filed May 23, 1968  4 Sheets-Sheet 4
PUMP CAM
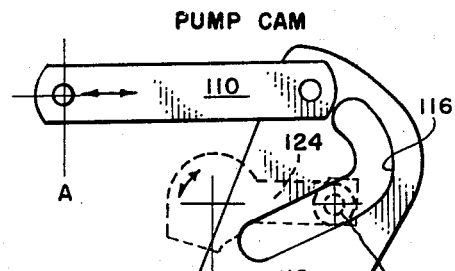
MOTOR CAM
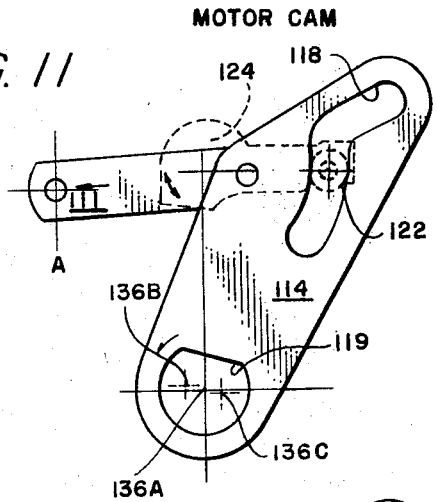
FIG. 11
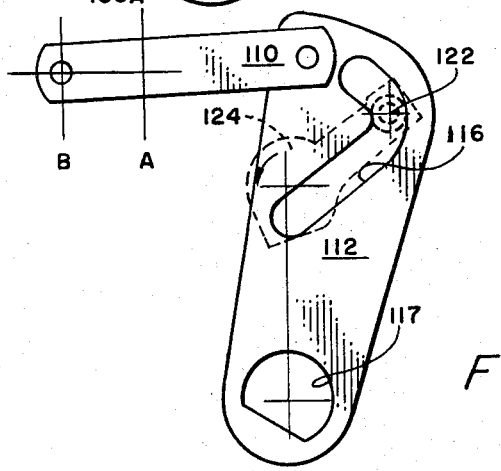
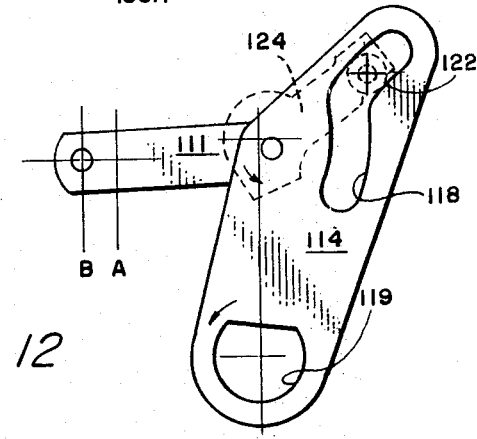
FIG. 12
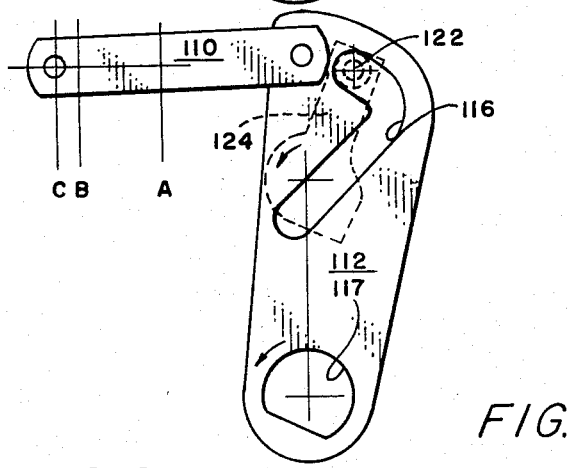
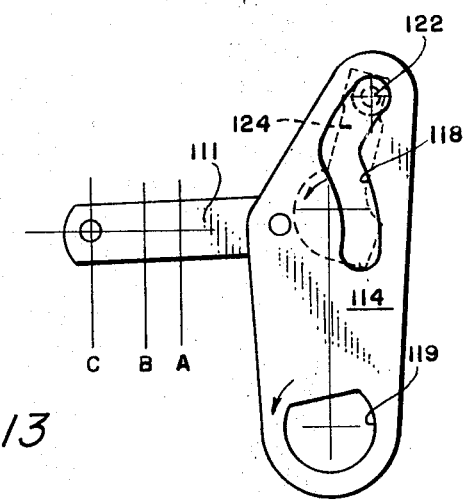
FIG. 13
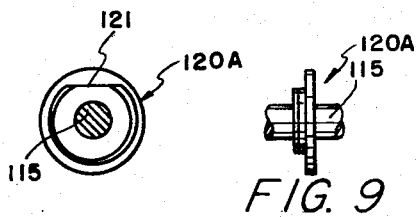
FIG. 8   FIG. 9   FIG. 10
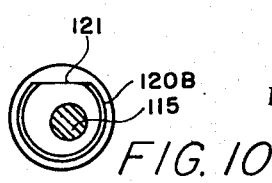
INVENTOR.
ROBERT J. MARTIN
BY Hubert Miller
ATTORNEY

United States Patent Office 3,521,450
Patented July 21, 1970

3,521,450
REMOTE HYDRAULIC CONTROL
Robert J. Martin, Hutchinson, Kans., assignor to The Cessna Aircraft Company, Wichita, Kans., a corporation of Kansas
Filed May 23, 1968, Ser. No. 731,394
Int. Cl. F16d 31/02
U.S. Cl. 60—53            10 Claims

ABSTRACT OF THE DISCLOSURE

The invention is a remote hydraulic two way control for sequentially positioning the respective swash plates of an axle piston pump and motor of a hydrostatic transmission. The control includes a manual operator having a pair of cam surfaces which separately actuate a pair of double acting master cylinders hydraulically connected to a pair of remote slave servos. The slave servos are mechanically connected to the respective tiltable swash plates of the pump and motor, whereby the plates are sequentially positioned to vary the displacement and to control the speed of the transmission. The control also includes a neutral position which affords automatic rephasing of the two slave servos with their respective master cylinders.

---

The type of hydrostatic transmission controlled by the present invention is described in detail in U.S. Pat. No. 3,238,724. It basically includes a variable displacement axial piston pump hydraulically connected to a similar variable or fixed displacement motor having an output shaft which supplies mechanical torque energy to whatever is being driven. By sequentially varying the displacements of the respective pump and motor, the output speed from the transmission can be varied from zero to a high r.p.m. Transmissions of this type can be used to drive the traction elements of vehicles such as trucks, tractors, farm machines and any large mass vehicles. The transmission has particular utility where a high starting torque along which a reasonably wide speed range is required.

The present invention is a control for transmitting signals hydraulically from a remote manual operator to the swash plates of a hydrostatic transmission. More particularly, the control includes a manual operator having a pair of cam surfaces which separately actuate a pair of master cylinders. Hydraulically connected to the master cylinders in a slave relation are a pair of servos which in turn vary the angular positions of the respective pump and motor swash plates. Although the control is described and illustrated with a transmission, it has equal application in a wide variety of other uses where there is a need for a push-pull type of remote operator.

In applications of this type, the remoteness of the control normally complicates the mechanism for transmitting the respective changes in displacement. In the prior art, various mechanical push-pull type control cables have been used which inherently have some undesirable features, the most prominent being that of backlash or slack. The input energy at one end of a relatively long cable having a series of bends is essentially absorbed in the cable or by friction before it reaches the opposite end. The adjustment problems of cable tension, and maintenance of the mechanical linkages at each bend in the cable are always present.

The hydraulic control of the present invention essentially eliminates the above mentioned problems inherent in a mechanical system. The non-compressible characteristic of a confined fluid used in a fluid displacing control provides a signal transmission of precision accuracy with a minimum amount of friction. The special linkage needed at a bend or corner in a mechanical cable system is avoided, since hydraulic lines can be bent to follow any desired path.

One of the primary advantages of the present system is that it provides a positive neutral position for the manual operator which automatically allows the swash plates of the pump and motor to rephase themselves with the manual operator. This rephasing feature eliminates the need for any adjustment of the system. For example, if there was a minor hydraulic leak in the system, the slave servo or swash plate would gradually become out of phase with the manual operator. With the present system, each time the manual operator with its associated master cylinders are returned to the neutral position, the servos rephase themselves, thus correcting the problem before it becomes of noticeable importance. The hydraulic control system of the present invention is friction free, self-lubricating, and has a unique self-adjusting feature which mechanical control systems do not have.

It is therefore the primary object of the present invention to provide a new and improved means for accurately controlling and sequentially positioning the respective swash plates of the pump and motor of a hydrostatic transmission system in which a variable displacement pump, a variable displacement motor, and manual control operator are all located remote from each other, and in which the precision of control is unaffected by the remote locations of the various units. An efficient swash plate control system for both the pump and motor, which allows these components to be located remote from each other as well as from the control operator is highly advantageous, primarily because it allows the driving motors to be located on the driving wheels, and the pump to be located on the chassis to be driven directly from the power plant.

Another object of the invention is to provide a method of control for a hydrostatic transmission which sequentially coordinates the changes in angular position of the respective pump and motor swash plates in such a manner as to provide a wide speed range at the power output shaft of the motor.

An additional object of the invention is to provide a remote manual control for positioning the respective pump and motor swash plates which has a rephasing means permitting the swash plates to periodically reposition themselves with respect to the position of the manual control.

Another object of the invention is to provide a remote manual control for positioning the respective pump and motor swash plates which has a positive neutral position whereby the positioning of the plates can be accurately determined.

The invention, and its various objects and advantages, will be more clearly understood when the following description is read in connection with the accompanying drawings in which:

FIG. 2 is a schematic view of the remote manual control and its related slave servos;

FIG. 3 is a detailed longitudinal section of the manual control with its related slave servos shown in schematic form;

FIG. 4 is a fragmentary section on an enlarged scale, of one of the master pistons;

FIG. 5 is a fragmentary section taken along line 5—5 of FIG. 3;

FIG. 6 is a fragmentary section taken along line 6—6 of FIG. 3;

FIG. 8 is a fragmentary end view of the pivot insert;

FIG. 9 is a fragmentary side view of the pivot insert;

FIG. 10 is a fragmentary end view of a modified form of the pivot insert;

FIG. 11 is a plan view of the pump and motor cams in the neutral position, placed side by side for purposes of illustration;

FIG. 12 is a similar view to FIG. 11 with the cams in the first forward positions; and FIG. 13 is a similar view to FIG. 11 with the cams in the maximum forward position.

For a better understanding of the present invention together with other and further objects thereof, reference is made to the following description taken in connection with the accompanying drawings and its scope will be pointed out in the appended claims.

Figure 1:
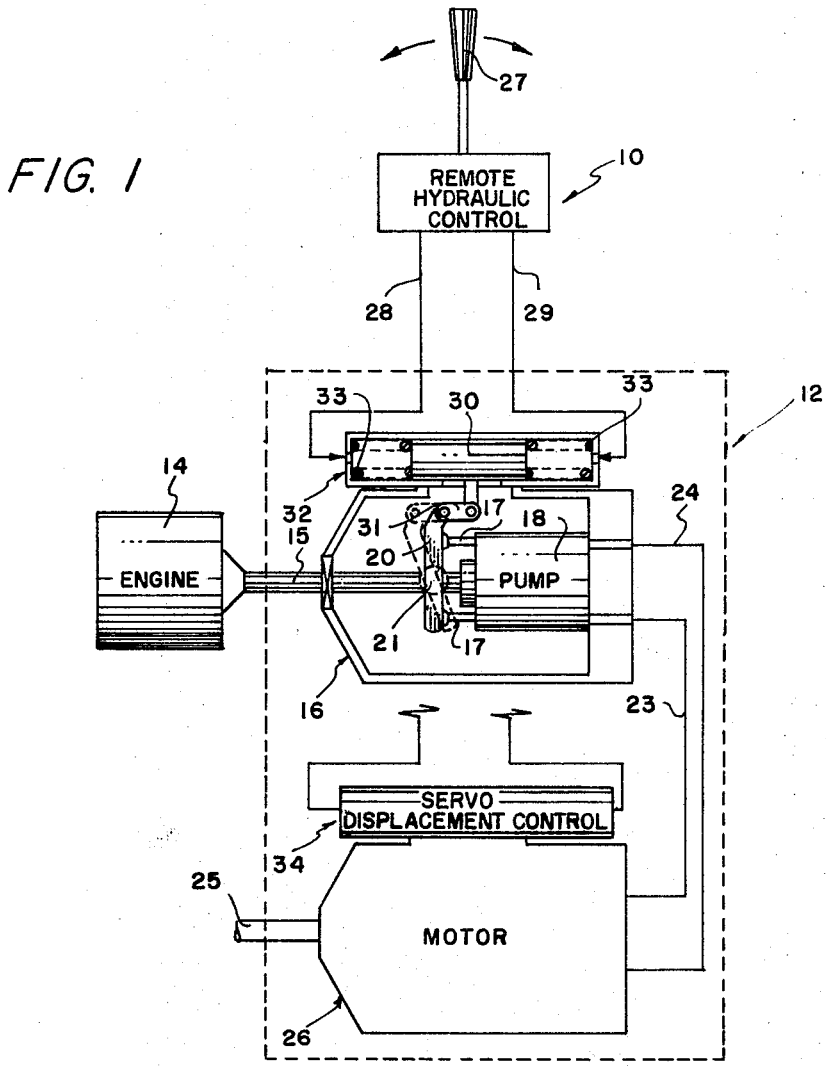
FIG. 1 is a schematic view of a hydrostatic transmission with a remote manual control which embodies my invention, portions of the transmission being shown in longitudinal section.

Referring to the drawings for a detailed description of the invention and more specifically to FIG. 1, a remote manual control 10 is shown in block form connected to a hydrostatic transmission generally identified by reference numeral 12. The transmission 12, which is a conventional structure, includes all the elements encompassed inside the dotted line. An engine 14 supplies the power through an input drive shaft 15 to a conventional variable volume axial piston pump 16. The fluid is displaced by the pump 16 through the rotation of a cylinder block 18 by shaft 15, causing the pistons 17 to reciprocate as they slide along the inclined face of the swash plate 20. The pump displacement is varied by tilting the swash plate 20 from a zero pump displacement (solid line FIG. 1) to a maximum displacement shown in dotted line in the same figure. Tilting the swash plate 20 in a clockwise direction from its neutral position in FIG. 1 causes fluid to be fed to the pump through conduit 23 and discharged through conduit 24. To reverse the fluid flow, the swash plate 20 is rotated in a counterclockwise direction from the neutral position.

Comprising the other half of the transmission 12 is a fluid motor 26. The motor is not shown in detail since it is a similar axial piston variable displacement structure as shown in pump 16, just described. The only difference is that one acts as a motor with an output of mechanical energy through drive shaft 25 while the other acts as a pump with output energy in the form of hydraulic pressure in lines 23 and 24. While the motor 26 is shown in the drawings as having a variable displacement, the invention has equal application with a fixed displacement motor. In the latter situation the slave servo 34 and its related structure would not be necessary. For a detailed description of the operation of transmissions of this type reference is made to the previously identified patent.

The remote hydraulic control 10 has a manual operator or handle 27 which will later be described in detail. The control 10 supplies hydraulic fluid through lines 28 and 29 to actuate piston 30 in servo 32. Piston 30 tiltably positions the swash plate 20 through a mechanical linkage 31, symbolically illustrated. Positioned on each side of the piston 30 are a pair of compression springs 33 which will later be described in conjunction with the rephasing circuitry. A similar slave servo 34 is connected to motor 26 for positioning of its respective swash plate. Servo 34 is also controlled by remote control 10. Movement of the single manual handle 27 causes the pump and motor swash plates to be tilted in a pre-determined sequential order as hereinafter described in connection with FIG. 3.

FIG. 2 DESCRIPTION

FIG. 2 illustrates portions of the control 10 in schematic form (surrounded by a double dotted line) along with pump and motor servos 32 and 34, just mentioned above, with the purpose of exemplifying the automatic rephasing ability of the present invention. Pistons 30 and 35 are actuated by remote master cylinders 36 and 46 respectively, through conduits 37, 38, and 41, 42. Thus, whenever pistons 40 and 50 are manually moved, pistons 30 and 35 acting as slaves move in response to the fluid displaced. Located in master cylinder 36 is a fluid passage 44 which provides direct communication between chambers 47 and 48 when the piston 40 is in the center or neutral position. Cylinder 46 has a similar passage 45 connecting chambers 51 and 52. With piston 40 in neutral position, fluid can freely flow from chamber 54 to chamber 55 through conduit 37, cylinder 36 and conduit 38. Piston 30 is thereby enabled to move independent of master cylinder 36. Positioned in chambers 54 and 55 and 63 and 64 are centering springs 33 which together bias piston 30 or 35 to a centrally disposed neutral position, as seen in the drawing. Therefore, when piston 40 is in the neutral position, piston 30 will automatically recenter itself by the effect of springs 33, thus rephasing the master and slave servos with respect to each other. Passage 44 communicates with a source of low pressure fluid 56 by way of conduit 57 through a one-way check valve 58 to maintain fluid in the system. Whenever there is an excess pressure build-up in the system due to temperature or other reasons, pressure is relieved through relief valve 60 into reservoir 61. Check valve 62 positioned downstream from source 56 prevents fluid from flowing back into reservoir 61. Should there ever be any leakage of fluid from the system, it is replenished by source 56.

FIG. 3 DESCRIPTION

The remote control 10, schematically illustrated in FIG. 2, is shown in detailed section in this figure. In the drawing, the control 10 is shown on its side, whereas in the actual working position the right side wall 66 would be the top of the control.

The control 10 is enclosed in a housing 67 divided into three separate areas: a fluid reservior 68, a low pressure chamber 84, and the working bores 69 and 70. The bores 69 and 70 are connected by an open cavity 72. Slidably positioned, one in each bore, are sleeves 74 and 76, respectively held in place by retaining rings 77. Accommodated inside sleeve 74 is a piston rod 78 carrying a piston 40, which together define the pump master cylinder 36 mentioned in FIG. 2. Sleeve 76 contains a similar piston rod 79 and piston 50 defining the motor master cylinder 46, also previously mentioned. Located at the ends of each cylinder 36 and 46 are conventional seals 80 surrounding the piston rods 78 and 79. Proximate the left ends of each sleeve 74 and 76 are a series of circumferentially spaced openings 81 which provide for fluid entry and exhaust into the working chambers 47 and 51 of the respective cylinders. Surrounding the openings 81 in chamber 47 is an annular cavity 87 which is connected to chamber 54 of slave servo 32 through passage 37 (shown schematically). A similar annular cavity 87 surrounds the openings 81 of chamber 51 and connects with chamber 63 of the slave servo 34 through passage 41. Proximate the opposite end of sleeves 74 and 76 are similar openings 82 and communicating annular cavities 87. Chamber 48 of master cylinder 36 is connected to chamber 55 of slave servo 32 through openings 82 and passage 38, while chamber 52 of a master cylinder 46 is connected to chamber 64 of motor servo 34 through passage 42.

Double acting piston 40 (FIG. 4) comprises a pair of composite seals 107 held in place by three retaining rings 108 and back-up washers 109. The rings 108 are seated in circuferential grooves in the rod 78. Piston 50 is constructed in a similar manner. When piston 40 is neutrally postioned, as seen in FIG. 4, the ports 85 on each side thereof are uncovered allowing fluid to pass freely between chambers 47 and 48 via chamber 72.

Figure 7:
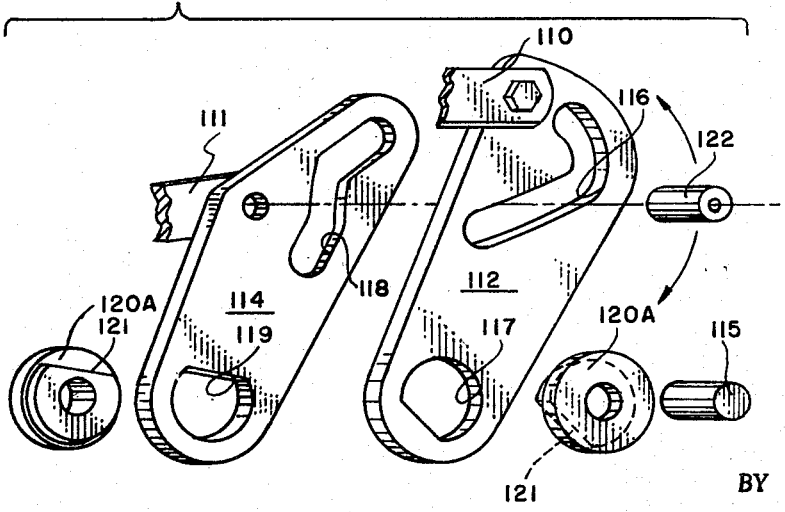
FIG. 7 is an exploded fragmentary view of the cam plates and their related mounting structure.

The pistons 40 and 50 are moved by rods 78 and 79 (FIG. 3), respectively, which in turn are actuated by links 110 and 111. Links 110 and 111 are connected to threaded couplings 113 which can be adjusted axially with respect to rods 78 and 79 for fine positioning of the master cylinder pistons 40 and 50. The opposite ends of links 110 and 111 are pivotally attached to cam plates 112 and 114, hereafter referred to as pump cam 112 and motor cam 114. The cams 112 and 114, shown in an exploded view in FIG. 7, are thin metal plates mounted in back-to-back relation with a common pivot pin 115. Cam 112 includes a cam surface 116 and a pivot insert opening 117. Pivot insert 120A has a reduced diameter portion with a keyed or flat surface 121 adapted to slidably fit into openings 117 and 119 of the pump and motor cam plates.

In FIG. 10 a modified form of pivot insert 120B is shown with an offset center as will later be described. Both cams 112 and 114 are driven by a single cam roller 122 mounted on a crank 124 (FIG. 3). Crank 124 is anchored to and rotated by shaft 125, which is journaled in the housing 67. Shaft 125 is manually rotated by handle 27, shown in FIG. 1. Crank 124 also includes an arcuate surface 126 (FIG. 3) concentric to shaft 125, having a detent notch 127 disposed therein. A pivotally mounted pawl 128 is spring biased by tension spring 129 against arcuate surface 126. Spring 129 is attached to a ring 130 which is mounted loosely on the collar portion 131 of crank 124. Notch 127, coacting with spring biased pawl 128, provides a positive "neutral" positioning mechanism for handle 27.

Chamber 68 of housing 67 acts as a fluid reservoir and also houses the cam and link structure just described. Chamber 68 is separated from chamber 84 by wall 71 and is vented to atmosphere through a breather plug 132. Plug 132 also serves as a filler plug for the reservoir.

Chamber 84 serves as a low pressure source of fluid for the system. A spring biased plunger 90, slidably positioned in bore 91, exerts a pressure on the fluid in chamber 84 by means of a spring 92. Fluid flows from chamber 84 to chamber 72 across check valve 58 (FIG. 6). When fluid is exhausted from chamber 84 and plunger 90 is retracted by means of handle 93, fluid from reservoir 68 flows across check valve 62 into chamber 84 (FIG. 5). Handle 93 is connected to plunger 90 through a telescoping structure which includes a sleeve 94 having an inwardly turned flange 95 which engages the head 96 of a pin 97. Pin 97 is attached to plunger 90.

Located in housing 67 is a high pressure relief valve 60 (FIG. 3). Excess pressure in cavity 72 acts against a spring biased plunger 101 through a passage 99. Ball 100 remains seated in a passage 102 until the pressure against plunger 101 overcomes spring 104 and the ball 100 is lifted from passage 102 against a fixed pin 103. With the ball unseated, fluid flows between the pin 103 and the plunger 101 into chamber 84 causing the plunger 90 to be moved outward in chamber 84.

OPERATION

The sequential positioning of the swash plates in the transmission 12 accomplishes essentially the same results as are achieved by shifting through a common gear transmission of an automobile. The operation hereafter described results in bringing the motor output shaft 25 of the transmission (FIG. 1) from zero up to maximum speed; by first varying the pump swash plate 20 from a minimum or zero displacement position toward a maximum displacement position, and starting to move the swash plate of the motor 26 from a maximum displacement position toward a minimum displacement position prior to the time the pump swash plate reaches its maximum displacement position. Conversely, when the speed of the transmission is reduced, the motor swash plate is first moved from minimum displacement position toward maximum displaceent position, and the pump swash plate is moved from maximum displacement position to minimum. The positioning of the pump and motor swash plates is accomplished by the remote hydraulic control 10 (FIGS. 1 and 2). The pistons 40 and 50 of master cylinders 36 and 46 located in the control 10 transmit signals to the pair of slave servos 32 and 34, which in turn angularly position the respective swash plates. The sequential movement of the master cylinders is accomplished by cam surfaces 116 and 118 following the rotating cam roller 122 which is mounted on crank 124, which crank is actuated by the manual operating handle 27. For an explanation of the movement of cam plates 112 and 114, FIGS. 11 through 13 have been included, showing the cams in their various positions hereafter described.

FIG. 11 shows the pump and motor cams 112 and 114 in their "neutral" positions. The cams are positively held in this position by pawl 128 engaging detent 127 (FIG. 3). In the neutral cam position the pump swash plate 20 is vertically positioned for zero displacement, the motor swash plate is positioned at maximum displacement, the master cylinder pistons 40 and 50 are in neutral rephasing position (FIG. 4), and the slave servo pistons 30 and 35 are spring centered. In viewing FIG. 11, as crank 124 begins to move in a counterclockwise direction, cam follower roller 122 forces cam 112 in a counterclockwise direction while motor cam 114 remains stationary. Counterclockwise movement of cam 112 causes piston 40 to be moved to the left, blocking left hand ports 85 (FIG. 4), and isolating the rephasing circuit. Further movement of piston 40 displaces fluid from chamber 47 to pump servo 32 causing the pump swash plate 20 to tilt from its vertical position. Slowly the pump 18 begins to deliver fluid to the motor 26.

As crank 124 approaches the FIG. 12 position, cam follower 122 forces motor cam 114 to move in a counterclockwise direction causing the motor swash plate to decrease the displacement of motor 26.

For a faster forward speed, lever 27 and crank 124 are further rotated in a counterclockwise direction, to the FIG. 13 position. In this position link 110 has moved its maximum distance to the left, and pump displacement is consequently at a maximum. Between positions B and C, link 111 has also moved its maximum distance to the left, and motor displacement has been decreased to a minimum. The maximum speed of transmission output shaft 25 is thereby achieved.

To cause the transmission output shaft 25 to reverse its direction, lever 27 and crank 124 are rotated clockwise from the FIG. 1 and 11 positions. This causes pump cam 112 to rotate clockwise moving piston 40 to the right, which in turn causes pump swash plate 20 to tilt in a clockwise direction, reversing flow of fluid from pump 18. The motor swash plate is not reversible. The clockwise movement of crank 124 does not move cam 114 since the lower portion of the cam surface 118 is concentric with the axis of the crank 124. It is therefore evident that the transmission cannot attain reverse speeds as great as forward speeds. If it is desired to have higher reverse speeds, the cam surface 118 could be shaped so that cam 114 rotated counterclockwise as crank 124 approached the end of its clockwise stroke.

If fluid leaks out of servo chamber 55 (FIG. 2) while piston 40 is being maintained in a position to the right of its neutral position, slave piston 30 will move to the right, and fluid from low pressure chamber 84 will flow across check valve 58 (FIG. 6) into chamber 47, due to the action of spring biased plunger 90. Slave servo 32 is now out of phase with master cylinder 36. As soon as piston 40 is returned to its neutral position, fluid will flow around piston 40 through ports 85 and cavity 72 as the springs 33 return slave piston 30 to its centered neutral position. When plunger 90 reaches the end of its stroke (when head 96 engages flange 95), handle 93 is manually pulled outward to recharge chamber 84 as previously described. As seen in FIG. 4, piston 40 moves a short distance before blocking ports 85. The effect of this on the manual control handle 27 is a small amount of lost motion before the system is responsive. The amount of lost motion can be varied by changing the distance between the ports 85 in chamber 47 and the ports 85 in chamber 48.

Over pressurization of the hydraulic control circuit is caused mainly by thermal expansion of the fluid. When the master cylinder plungers 40 and 50 are in their neutral positions (FIG. 3), chambers 47, 58, 51 and 52 are in communication with the pressure relief valve 60, thereby allowing any excess pressure to be relieved into low pressure chamber 84. If pressure is relieved through valve 60 while pistons 40 or 50 are to the right or left of their neutral positions, the system is again temporarily out of phase.

FIG. 10 MODIFICATION

The control 10 of the present invention has application to transmissions of larger or smaller size by a slight modification in the mechanical linkage of the control. In a larger displacement transmission, the servos 32 and 34 are displaced laterally a greater distance from the swash plate pivot axes 21, FIG. 1. Under such a condition, in order to produce the same maximum swash plate inclination achieved in the smaller transmission, the stroke of the piston 30 must be increased. In the novel structure of the present invention this necessary variance in servo piston travel is achieved by merely changing the pivot inserts 120, which pivotally support the cams 112 and 114. The effect of substituting the modified eccentric insert 120b, shown in FIG. 10, is to shift the axis of rotation of the cams 112 and 114 upward and to the left of their previous center 136A to a new center 136B, as seen in FIG. 11. The effect of this repositioning of the cams 112 and 114 results in a longer stroke for pistons 40 and 50 with the same angular displacement of crank 124.

It is understood that variations from the form of the invention disclosed herein may be made without departure from the spirit and scope of the invention, and that the drawings and specification are to be considered as merely illustrative rather than limiting.

Having described the invention with sufficient clarity to enable those familiar with the art to construct and use it, I claim:

1. In a hydrostatic transmission system:
   a power driven variable displacement fluid pump (16) with inlet and discharge ports including means (20) to vary the displacement;
   a variable displacement fluid motor (26) with inlet and discharge ports including means to vary the displacement;
   conduit means (23 and 24) operatively connecting the inlet and discharge ports of the pump to those of the fluid motor;
   first servo means (32) operatively connected to actuate said displacement means of the pump;
   second servo means (34) operatively connected to actuate said displacement means of the motor;
   remotely positioned control means (10) hydraulically connected to said first and second servo means for actuating said servos in a master-slave relationship in a pre-set sequential order whereby the transmission provides a variable range of speeds; and
   means for re-phasing the first and second servo means with the control means responsive when the control means is neutrally positioned.

2. A hydrostatic transmission system as set forth in claim 4 wherein said pump (16) and motor (26) are both of the positive displacement axial piston type having tiltable swash plate displacement varying means (20); the first and second servo means each includes a slave piston (30 and 35) movable in a cylinder; and the control means (10) includes first and second master cylinders (36 and 46) which individually control and actuate said first and second servos respectively.

3. A hydrostatic transmission system as set forth in claim 4 wherein said pump (16) and motor (26) are both of the positive displacement axial piston type having tiltable swash plate displacement varying means (20);
   the first and second servo means each includes a slave piston (30 and 35) movable in a cylinder;
   spring means for neutrally positioning each slave piston;
   the control means (10) includes first and second master cylinders (36 and 46) which individually control and actuate said first and second servos respectively, and
   said re-phasing means includes fluid by-pass means (44 and 45) effective upon neutral positioning of the control means to afford neutral positioning of the slave pistons by said spring means.

4. A hydrostatic transmission system as set forth in claim 4, wherein said pump (16) and motor (26) are both of the positive displacement axial piston type having tiltable swash plate displacement varying means (20);
   the first and second servo means each includes a slave piston (30 and 35) movable in a double acting cylinder, each slave piston having a neutral position;
   the control means (10) includes first and second double acting master cylinders (36 and 46) which individually control and actuate said first and second servos respectively, pistons (40 and 50) positioned in said master cylinders each defining two working chambers in the respective cylinders, said pistons having a neutral position;
   said re-phasing means includes first and second passage means each definings a fluid path between the two working chambers of the respective master cylinders when the pistons of the master cylinders are neutrally positioned; and
   spring means urging each servo piston into a neutral position.

5. A hydrostatic transmission system, as set forth in claim 4, wherein:
   said pump (16) and motor (26) are both of the positive displacement axial piston type having tiltable swash plate displacement varying means (20);
   the first and second servo means each includes a slave piston (30 and 35) movable in a double acting cylinder, the piston having a neutral position;
   the control means (10) includes first and second double acting master cylinders (36 and 46) respectively having pistons (40 and 50) therein defining two working chambers in each cylinder, said pistons having a positive neutral position;
   first and second cam means (112 and 114) operatively connected in driving relation to the respective pistons of the master cylinders;
   a cam actuating means operably connected to the first and second cam means, whereby upon actuation, the first and second cam means sequentially change the respective displacement of the pump and motor;
   said re-phasing means includes first and second passage means (44-45) each affording free flow of fluid between the two working chambers of the respective master cylinders when the pistons of the master cylinders are neutrally positioned; and
   spring means normally urging each slave piston (30 and 35) into a neutral position.

6. A hydrostatic transmission system as set forth in claim 4, wherein said pump (16) and motor (26) are both of the positive displacement axial piston type having tiltable swash plate displacement varying means (20);
   the first and second servo means each includes a slave piston (30 and 35) movable in respective double acting cylinders, each piston having a neutral position;
   the control means (10) includes first and second double acting master cylinders (36 and 46) each having a piston (40 or 50) therein defining two working chambers in each cylinder, said pistons having positive neutral position;

first and second cam means (112 and 114) operably connected to the respective pistons of the first and second master cylinders;

a cam actuating means connected with the first and second cam means;

said first and second cam means being shaped to provide lineal motion to the respective pistons of the master cylinders, whereby the swash plate of the pump is moved from a zero displacement position toward a maximum displacement position, before reaching said maximum displacement position the motor swash plate begins moving from a maximum displacement position toward a minimum displacement position, with the motor swash plate reaching its minimum displacement subsequent to the pump swash plate reaching its maximum displacement;

said re-phasing means includes first and second passage means affording free flow of fluid between the two working chambers of each master cylinder when the respective piston of each master cylinder is neutrally positioned; and spring means urging each slave piston (30–35) into a neutral position.

7. In a hydrostatic transmission which includes:
(a) a power driven variable displacement fluid pump (16)
(b) means for varying the pump displacement;
(c) a variable displacement motor (26) communicatively connected to receive and be driven by the fluid output of said pump; and
(d) means for varying the displacement of said motor a control system for controlling and actuating the respective displacement varying means of the pump and motor, comprising:

first servo means (32) having a movable piston (30) operably connected to the displacement varying means of the fluid pump, second servo means (34) having a movable piston (46) operably connected to the displacement varying means of the fluid motor;

remotely positioned first and second master cylinder means (36 and 46) hydraulically connected to said first and second servo means, respectively, to actuate same in a master-slave relation;

first and second cam means (112 and 114) connected respectively to the pistons of the first and second master cylinders, in driving relation; and a cam actuating means (124) for driving the cams in such manner that the cams sequentially actuate the first and second master cylinder pistons to vary the displacements of the pump and motor in a pre-set order, providing a variable range of transmission speeds.

8. In a control system as set forth in claim 7, in which:

said first and second servos are double acting hydraulic cylinders having independent piston centering means (33) biasing the pistons (30 and 35) into a neutral position;

the first and second master cylinder means includes pistons (40 and 50) respectively disposed in double acting cylinders and defining two separate working chambers in each cylinder, said pistons (40 and 50) being connected respectively to the first and second cam means;

and means providing positive neutral positions for the respective pistons.

9. The control system described in claim 8, in which:

the respective pistons of the first and second servo means are spring biased to neutral positions;

and passage means, one associated with each master cylinder, affording free flow of fluid between the two working chambers in each master cylinder when the respective pistons (40 and 50) thereof are neutrally positioned, and consequently affording re-phasing of the respective pistons (30 and 35) of the servos each time their related master cylinder pistons are neutrally positioned.

10. In a control system as set forth in claim 7 wherein said first and second cam means includes a pair of pivotally mounted cam plates each having different shaped cam surfaces (116 and 118) thereon;

and means for shifting the axis of rotation of said cam plates whereby the lineal motion imparted by the cams to the pistons of the master cylinder means is increased or decreased to accommodate larger or smaller transmission components.

References Cited

UNITED STATES PATENTS

| | | | |
|---|---|---|---|
| 568,736 | 10/1896 | Brown | 60—54.5 |
| 1,603,867 | 10/1926 | Rogers. | |
| 2,383,180 | 8/1945 | Ellinwood | 60—54.5 |
| 2,391,996 | 1/1946 | Muller. | |
| 3,238,724 | 3/1966 | Miller. | |

EDGAR W. GEOGHEGAN, Primary Examiner

UNITED STATES PATENT OFFICE
CERTIFICATE OF CORRECTION

Patent No. 3,521,450          Dated July 21, 1970

Inventor(s) R. J. Martin

It is certified that error appears in the above-identified patent and that said Letters Patent are hereby corrected as shown below:

Column 1, line 14, delete "axle" and insert --axial--.
Column 4, line 71, delete "circuferential" and insert --circumferential--.  Column 5, line 75, delete "displaceent" and insert --displacement--.  Column 7, line 68 and column 8, lines 2, 16, 37 and 64, for the claim reference numeral "4," each occurrence, should read --1--.  Column 8, line 30, delete "definings" and insert --defining--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents